H. E. REEVE.

FUEL REGULATOR.

APPLICATION FILED MAR. 1, 1920.

Reissued June 22, 1920. 14,895.

Inventor
Henry E. Reeve
By his Attorney

UNITED STATES PATENT OFFICE.

HENRY E. REEVE, OF NEW YORK, N. Y.

FUEL-REGULATOR.

14,895. Specification of Reissued Letters Patent. Reissued June 22, 1920.

Original No. 1,238,940, dated September 4, 1917, Serial No. 747,648, filed February 11, 1913. Application for reissue filed March 1, 1920. Serial No. 362,555.

DIVISION B.

*To all whom it may concern:*

Be it known that I, HENRY E. REEVE, a citizen of the United States of America, and residing at New York, in the county of Kings and State of New York, have invented new and useful Improvements in Fuel-Regulators, of which the following is a specification.

My invention relates particularly to thermostatic devices, and particularly such as are applicable to the control of fuel supply for automatic water heaters.

The main object of the invention is to provide a device which is sensitive and quick to respond to changes in temperature. Another object is to provide a simple and yet reliable mechanism for converting thermostatic effects so as to operate valves and the like. Another object is to provide a construction which can be readily adjusted so as to operate at the desired temperatures.

In its preferred form, the thermostatic device acts in accordance with the temperature of the heater to control flow of fluid under pressure to a pressure actuated device, which device in turn operates certain valve mechanism to positively control the flow of gas to the burner. In practice I utilize the fuel gas as the fluid under pressure for operating the pressure operated device.

Figure 1:
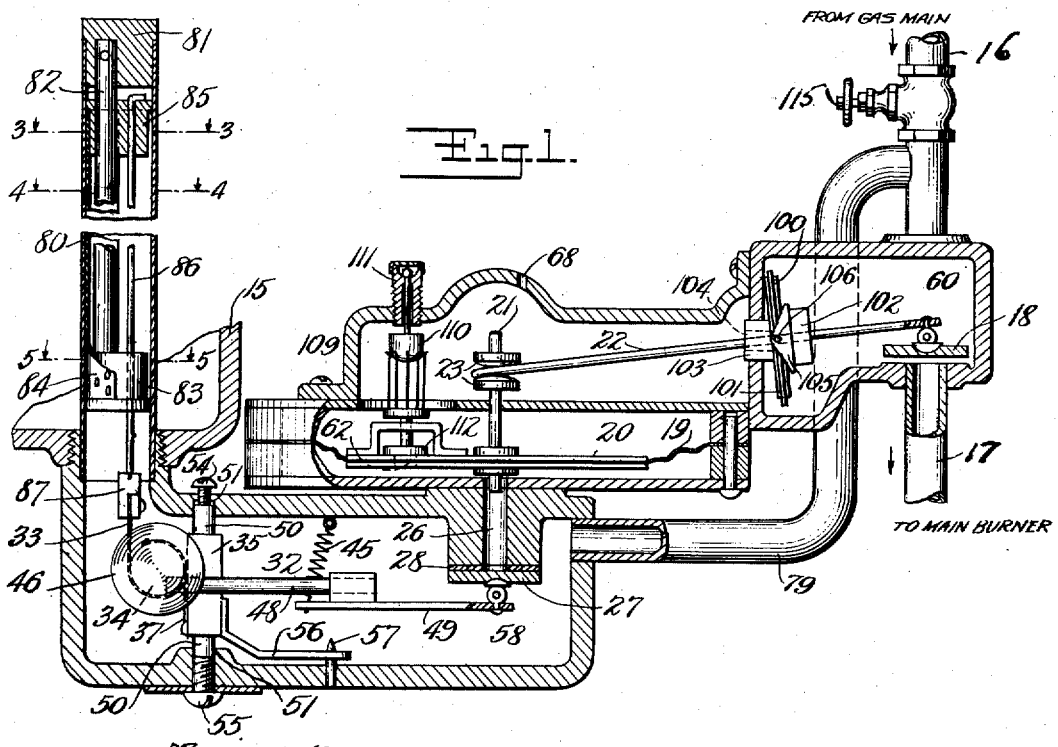
Figure 1 is a vertical sectional view of one form of apparatus embodying the improvements of my invention.
Figure 3:
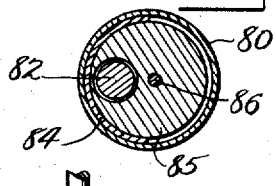
Figure 4:
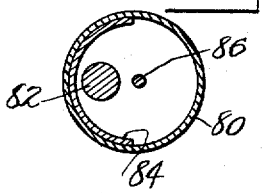
Figure 5:
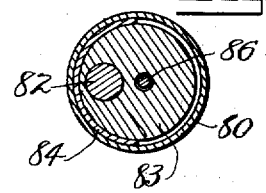

Figs. 3, 4 and 5, are horizontal sectional views of the thermostatic device taken respectively on the planes of the lines 3—3, 4—4, and 5—5 of Fig. 1.

Figure 6:
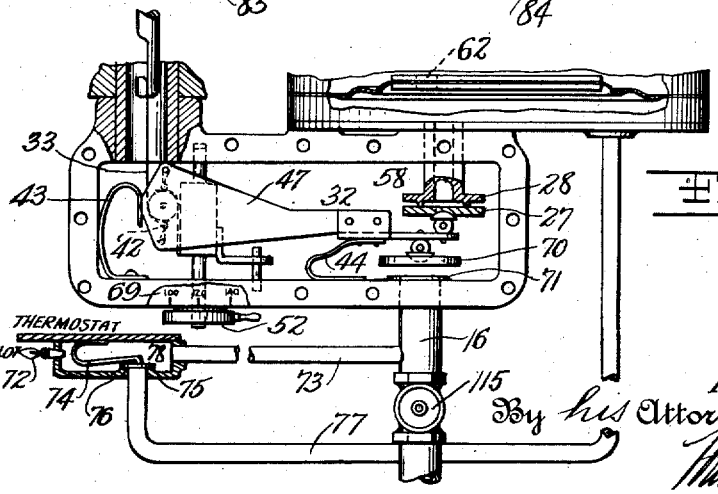

Fig. 6, is a vertical projection and partial section showing a modified form of mechanism embodying some of the features of my invention.

A portion of the water chamber or reservoir of the heater is indicated at 15. 16 designates the gas supply pipe or conduit which supplies gas to the apparatus, and 17 is the conduit which conveys gas from the controlling apparatus to the main burner.

The flow of gas to the main burner may be controlled directly by a main regulating valve 18 and a pressure operated device is preferably utilized as the means for positively operating this valve. The pressure operated device is here shown in the form of a diaphragm 19 mounted within a diaphragm chamber 20 and mechanically connected with the valve by means of a post 21 on the diaphragm which engages with one end of a pivoted lever 22 whose opposite end is connected with the valve 18. To properly regulate the rising and falling movement of the diaphragm with the closing and opening movement of the regulating valve, these parts, or the mechanical connections between are preferably made relatively adjustable. Such adjustment is in this case provided for by connecting the end of the lever adjustable to the diaphragm post, as by engaging it between the adjustable abutments 23, carried by the post (see Fig. 1).

While the pressure actuated device may be operated by any suitable fluid under pressure, I prefer to use the gas itself as the medium for operating the device. An auxiliary gas passage 26 is therefore preferably provided leading to the underside of the diaphragm 19, and flow of the actuating fluid is governed by an auxiliary gas valve 27 arranged to coöperate with the seat 28 at the end of such passage. The auxiliary valve 27 which governs the admission of the actuating fluid to the pressure operated device is preferably mounted on the end of an arm or lever 32, which is connected to a part of a thermostatic device by means of a tape or ribbon 33. The operating arm 32 is pivoted so as to be capable of the oscillatory movement necessary in the opening and closing of the auxiliary gas valve, and to reduce friction as much as possible and to eliminate lost motion I prefer to use a special form of pivot mounting at this point. This mounting consists of a roller 34 carrying the valve operating arm and making rolling engagement with a relatively fixed support 35, and a pair of flexible metallic tapes or ribbons, which pass in opposite directions each part way around the roller. The ends of these ribbons are fastened either directly or indirectly to the roller, so that the roller may be rotated thereby. In the form shown in Fig. 1, the ribbon 33 which comes from the thermostat extends downwardly part way around the roller and is secured to the roller, and another ribbon 37, having one end secured to the support 35 passes upwardly at the opposite side of the roller and part way therearound to where it is secured to the roller. The roller and lever are made fixed in respect to each other so it will be clear that the anchoring of the ribbons to the lever is the equivalent of fastening them direct to the roller. When made as in Fig. 6, I have provided guides 42 for holding the ribbons in proper engagement with the surface of the roller. The roller is in some way held in proper engagement with its support 35 and provision is made for rotating it in a direction reverse to that in which it is turned by the thermostat. In Fig. 6, a spring 43 is shown for holding the roller in proper engagement with its support and a second spring 44 is illustrated which acts upon the lever in opposition to the turning movement of the thermostat. In the form disclosed in Fig. 1, a single spring 45 performs both these functions, it being, as shown, connected with the lever so as both to lift the lever in opposition to the pull of the thermostat and to draw the lever over with the roller in engagement with the support. To prevent side slipping of the roller with respect to the support the roller may have flanges as indicated at 46 in Figs. 1 and 2 to engage over the sides of the support, or the place of these flanges may be taken, as shown in Fig. 6 by making up the lever with two side bars 47 to fit the opposite sides of the support. The lever shown in Figs. 1 and 2 also is preferably made up of two side bars 48 to pass on opposite sides of the support, but in this case the side bars do not contact with the support. Preferably also the valve lever has a more or less flexible end portion 49 which acts to hold the valve closed under a certain amount of spring tension.

To secure the proper coöperative action between the thermostat and the auxiliary valve, a certain amount of adjustment in the relation of these two parts may be necessary. This I provide for preferably by mounting the support so that it may be shifted to carry the valve on the valve lever 32 toward or away from its seat. Thus the support is made with rounded ends 50 guided in sockets 51, the actual shifting being accomplished by an adjusting screw 55 or nut 52 on the outer threaded end of the support. In the form shown in Fig. 1, the support has rounded ends guided in sockets as before, but the shifting means in this instance consists of the screws 54 and 55 engaging with the upper and lower ends respectively of the support. The support may be held against rotative movement in any suitable way, such for instance, as by providing it with an outstanding arm 56 slidingly engaged over a fixed guide stud 57.

The operation of the parts thus far described will be best understood by reference to Fig. 1. Normally with the burner in operation, the flow of gas is from the supply pipe 16 through valve chamber 60, past the main regulating valve 18 and through conduit 17 to the burner. The thermostat, being subjected to the heat of the water in the reservoir, expands, thereby pulling upwardly on the ribbon 33 and rotating the roller and its attached lever, until finally at the predetermined temperature for which the thermostat has been set, the auxiliary valve 27 is carried away from its seat. Gas under pressure now flows through the pipe 79 and chamber 58 and auxiliary gas passage 26 to the underside of the diaphragm. The diaphragm is lifted by this pressure of gas and thereupon acts to rock the lever 22 to close the main regulating valve 18. Further feed of gas to the burner is thus cut off. As the hot water is consumed or becomes cooled, the thermostat contracts, thereby releasing its upward pull on the ribbon 33 and the spring 44 or 45 acting in opposition to this pull then operates to close the auxiliary valve 27. This condition of the parts is represented in Fig. 6. Further supply of gas to the underside of the diaphragm is thus cut off and the slight leakage of gas causes a slight reduction in the pressure beneath the diaphragm. This leakage may be provided for in any suitable manner. This reduction in pressure and the weight of the diaphragm itself tend to cause the diaphragm to descend. I preferably utilize this slight preliminary descending movement to operate certain mechanism for accelerating the movement of the parts. This accelerating mechanism is here shown in the form of a relief valve 112 carried on the diaphragm and arranged to normally nearly close a relief opening 62 therein. This valve 112 may have its stem 113 guided in a yoke 114. At the time of the first preliminary descending movement of the diaphragm, the valve is temporarily supported so that the diaphragm will fall away from the valve and thus open up the relief port 62. The means for thus temporarily sustaining the valve is in Fig. 1 a series of spring fingers 109, which engage frictionally with a knob 110, carried by the adjustable bushing 111. The frictional engagement between these parts is sufficient to support the relief valve while the diaphragm is slowly settling, and the relief valve being thus held open, the gas beneath the diaphragm is allowed to suddenly escape. This escape of the gas permits the diaphragm to fall quickly and as it falls, it rocks the valve lever 22 downward and again opens the regulating valve for the main burner. The small amount of gas released from beneath the diaphragm may be allowed to escape to atmosphere or be otherwise disposed of through a vent 68.

By adjusting the support 35 for the valve carrying lever the amount of expansion in the thermostat necessary to open the auxiliary gas valve and hence the temperature at which the main burner will be cut off, may be determined at will. For convenience in setting the parts for different temperatures there may be provided a scale 69, laid off in degrees of temperatures.

To provide against overheating, the thermostat may cut off flow of gas upon excessive heating as shown in Fig. 6. This may be conveniently accomplished by mounting a cut-off valve 70 on the valve lever 32 to coöperate with a valve seat 71 at the point where the gas supply pipe 16 opens into the gas chamber 58. If the heater should become excessively hot, as for instance, by reason of the pressure operated device failing to properly cut off flow to the main burner, then, the thermostat in expanding still further will turn the lever 32 and carry the valve 70 into engagement with its seat, thereby positively cutting off any further flow of gas to the burner. The seat for the auxiliary valve and the seat for the cut-off valve are disposed substantially opposite to each other so that the valve lever may vibrate therebetween to carry either one or the other valve to its seat. The parts are so proportioned and so disposed that only upon excessive heating will the lever be shifted far enough to close the cut-off valve.

As a further safeguard, means are preferably provided for shutting off flow to the main burner in the event of the extinguishment of the pilot. A means for this purpose is disclosed in Fig. 6, wherein 72 designates the pilot for the main burner, and 73 a branch conduit for supplying it with gas. Associated with this pilot and subject to the heat thereof is a thermostatic device 74 carrying a valve 75, which is arranged to engage a seat 76, and serves to control flow through a conduit 77 leading to the pressure operated device. The thermostatic device, which may be of the usual compound construction, is heated by the pilot so long as it is burning and in its expanded condition it serves to hold the valve 75 closed. When however the pilot is extinguished this thermostatic device cools off and lifts valve 75 from its seat. A flow of gas is now opened up from branch conduit 73 through the pilot casing 78, past the now open valve 75 and conduit 77 to the pressure actuated device which operates in the manner previously described to shut off flow to the main burner.

Figure 2:
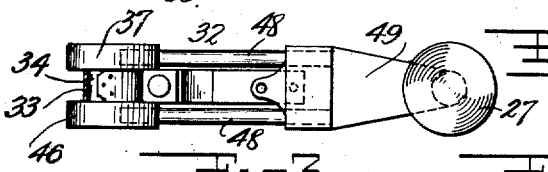
Fig. 2, is a plan view of the transmitting lever of the apparatus of Fig. 1.

In Figs. 1 and 2 the gas simply flows from the supply conduit 16 direct through the valve chamber 60 to the conduit 17 leading to the burner and the gas for operating the diaphragm is taken off from the supply conduit through a branch conduit 79 which extends to the gas chamber 58 within which is located the auxiliary valve which controls flow to the diaphragm.

The thermostat illustrated in detail in Figs. 1, 3, 4, and 5 is extremely sensitive to change in temperature. It is made substantially as follows:—

A tube 80 for instance of brass, open at the bottom is secured at the bottom to a wall of the water reservoir 15. The upper end of this tube is closed by a plug 81 to which is secured the upper end of a rod 82 for instance of steel. The lower end of this rod carries a sleeve 83. A tubular or semi-tubular member 84 for instance of zinc, is secured at its lower end to the sleeve 83, and at its upper end carries a second sleeve 85. This sleeve 85 is not attached to the tube 80 and has a free passage for the rod 82. The rod 86 for instance of steel, is secured to the sleeve 85 and passes freely through the sleeve 83 at the bottom. The zinc tube 84 has a high co-efficient of expansion and being in contact with the inner wall of the brass tube 80 receives by conduction through the tube, the heat of the water in the water container 15.

As the temperature of the water rises, the tube 80 is elongated and carries with it the rod 82 and sleeve 83 and zinc tube 84 and the latter in turn is itself elongated giving an additional pulling movement to the sleeve 85 and the rod 86. The rod 82 and rod 86 are preferably of relatively nonexpansible material and it will also be noted that they are so spaced apart throughout the principal part of their ranges from the tubes that they are but little affected by changes of temperature and therefore but little, if any, detract from the effective movement of the brass and zinc tubes. The rod 86 may be connected by means of a suitable coupling 87 to the tape 33 which operates the roller.

To prevent leakage at the joint where the valve operating lever 22 passes into the valve chamber 60 of the main regulating valve, I have devised a special form of gas-tight joint, consisting in substance of a flexible diaphragm connected between the lever and the wall through which the lever passes. This diaphragm is preferably made up of two thin metallic disks 100 and 101 interconnected at their edges and connected at their central portions to the lever 22 and the supporting wall respectively. The disk 100 is joined to the lever preferably by securing it to a bushing 102 fast on the lever and the disk 101 is preferably connected to a bushing 103 mounted in the supporting wall. The opening 104 through which the lever passes is, it will be noted, of a size sufficient to permit free movement of the lever. The lever is in this way pivotally supported in a manner which is substantially frictionless. To prevent sidewise movement of the lever and to limit its pivoting movement to a single plane—that is to a straight up and down rocking movement, I preferably provide guiding means in the form of a horizontally disposed yoke 105 engaged at its center with the lever and having pivots 106 at its opposite ends. This yoke may, as shown, be connected to or form a part of the bushing 102. The pivots of the yoke are preferably disposed in the same plane with the diaphragm so as to substantially coincide with the line of flexure of the diaphragm, the yoke being for this purpose offset to bring the pivots into this plane. Since the normal pressure of gas is only slightly above atmospheric pressure, the weight of the valve 112 and attached parts is sufficient to keep it closed normally.

Suitable means may be provided for manually cutting off the flow of gas to the apparatus. Such means is here illustrated in the form of the hand valve 115. The fuel regulator itself is claimed in my concurrent Reissue Application #362,554.

I claim:

1. In a regulating device, the combination of a water reservoir, a heat operated device for said reservoir, a roller, a support for said roller, a flexible metallic ribbon connecting said roller to said support, a flexible metallic ribbon connecting the roller to a part of the heat operated device aforesaid, an operating lever connected to the roller and means actuated by said lever.

2. In a regulating device, the combination of a water reservoir, a heat operated device for said reservoir, a roller, a support for said roller, a flexible metallic ribbon connecting the roller to said support, a flexible metallic ribbon connecting the roller to a part of the heat controlled device aforesaid, an operating lever connected to the roller, means operated by said lever and means for adjusting the support for the roller.

3. In a regulating device, the combination of a water reservoir, a heat operated device for said reservoir, a roller, a support for said roller, a flexible metallic ribbon connecting the roller to said support, a flexible metallic ribbon connecting the roller to a part of the heat controlled device aforesaid, an operating lever connected to the roller, means operated by said lever and a spring opposing the operation of the heat operated device.

4. In a regulating device, the combination of a water reservoir, a heat operated device for said reservoir, a roller, a support for said roller, a flexible metallic ribbon connecting the roller to said support, a flexible metallic ribbon connecting the roller to a part of the heat controlled device aforesaid, an operating lever connected to the roller and a valve connected to said operating lever.

5. In a regulating device, the combination of a water reservoir, a heat operated device for said reservoir, a roller, a support for said roller, a flexible metallic ribbon connecting the roller to said support, a flexible metallic ribbon connecting the roller to a part of the heat controlled device aforesaid, an operating lever connected to the roller, a valve connected to the operating lever and a spring normally tending to close said valve.

6. In a device of the character set forth, the combination of a support, a roller bearing against said support, an operating arm carried by the roller, means operated by said arm, a flexible ribbon passing part way around the roller and connecting the roller to the support, a second flexible ribbon passing part way around the roller in a direction opposite to that of the first ribbon and a controlling device connected to the second ribbon for imparting rotative movement to the roller and the operating arm carried thereby.

7. In a heat controlled device, the combination of a water reservoir, a metallic tube supported at its lower end by said reservoir, a rod of relatively low co-efficient of expansion having one end secured to the inner end of said tube, an intermediate member of high co-efficient of expansion having one end secured to the free end of said rod and lying in contact with the inner surface of said tube between said rod and said tube, a transmitting member secured to the inner end of said intermediate member and passing through the outer end of said tube and means operated by said transmitting member.

8. In a device of the character described, a support, a lever embracing said support, means operated by said lever, means for preventing rotation of said support and said lever, a roller carried by said lever, a flexible tape connecting said support and said roller, a thermostatic element, and a flexible tape connecting said thermostatic element with said roller.

9. In a device of the character described, a support, a lever embracing said support, means operated by said lever, means for preventing rotation of said support and said lever, a roller carried by said lever, a flexible tape connecting said support and said roller, a thermostatic element, and a flexible tape connecting said thermostatic element with said roller, and means for adjusting said support, said lever, and said roller simultaneously.

10. In a device of the character described, a combination of a lever, means actuated by said lever, a support, a roller carried by said lever, a thermostatic element, flexible tapes connecting said lever with said thermostatic element and with said support, and spring means opposing the action of said thermostatic element and holding said roller against said support.

HENRY E. REEVE.